United States Patent [19]

Amada et al.

[11] Patent Number: 5,710,787
[45] Date of Patent: Jan. 20, 1998

[54] OUTPUT CONTROLLER FOR LASER DEVICE

[75] Inventors: Yoshiho Amada; Osamu Wakabayashi; Noritoshi Ito, all of Kanagawa, Japan

[73] Assignee: Kabushiki Kaisha Komatsu Seisakusho, Tokyo, Japan

[21] Appl. No.: 446,858

[22] PCT Filed: Sep. 28, 1994

[86] PCT No.: PCT/JP94/01601

§ 371 Date: Jun. 5, 1995

§ 102(e) Date: Jun. 5, 1995

[87] PCT Pub. No.: WO95/10131

PCT Pub. Date: Apr. 13, 1995

[30] Foreign Application Priority Data

Oct. 5, 1993 [JP] Japan .................... 5-249483

[51] Int. Cl.⁶ .................................................. H01S 3/10
[52] U.S. Cl. .................. 372/25; 372/57; 372/31; 372/29; 372/38
[58] Field of Search .................. 372/25, 57, 9, 372/31, 29, 38

[56] References Cited

U.S. PATENT DOCUMENTS

5,463,650  10/1995  Ito et al. ........................ 372/57

*Primary Examiner*—Leon Scott, Jr.
*Attorney, Agent, or Firm*—Diller, Ramik & Wight, PC

[57] ABSTRACT

An object is to perform controlling operation always accurately to eliminate a spiking phenomenon generated in a laser device. In an output controller (6), excitation intensity data causing energies of continual pulses to be set to have a desired identical value is previously stored in association with the respective continual pulses. In an output monitor (5), the energies of the oscillated pulses are detected. And detected values of energies of pulses in a continual pulse oscillation already done are compared with a desired pulse energy value and previously-stored charging voltages associated with the respective pulses are corrected in the output controller (6) on the basis of the comparison result. When the present invention is applied to control of an output of a light source in an aligner, an accuracy of control of exposure light can be remarkabley improved.

8 Claims, 9 Drawing Sheets

OUTPUT CONTROLLER FOR LASER DEVICE

TECHNICAL FIELD

The present invention relates to an output control system for a laser device which is used mainly as a light source of a stepping reduction projection aligner (which will be referred to as the stepper, hereinafter) for causing discharging excitation of the laser device and oscillation thereof.

BACKGROUND ART

In a stepper, for the purpose of maintaining the resolution of a circuit pattern at a constant or higher level, strict control of the quantity of exposure light is necessary. Meanwhile, an excimer laser used as a light source of the stepper is of a so-called pulse discharging excitation laser gas type, for which reason the pulse energy per pulse varies from one another. Thus, in order to improve an accuracy in the control of the quantity of exposure light, it is necessary to make the above variations small. In addition, since the exposure light is of an intermittent type, the control of the exposure light quantity must be carried out in a way different from the prior art shutter control when a mercury lamp emitting continuous light is used as a light source.

For the purpose of realizing an improvement in the exposure light quantity control, there has been proposed a so-called plural pulse exposure method in which a plurality of pulses are continuously oscillated for exposure, as disclosed in a literature entitled "Excimer Laser Lithography", written by Miyaji, et al., International Laser/Application '91, Seminar L-5/pp. 36–51.

This method utilizes the fact that, since variations in the oscillation pulse energy of an excimer laser can approximate nearly a normal distribution, a dispersion in the energy accumulated after n times of pulse oscillation for exposure corresponds to $1/(n)$ of the dispersion in the energy per pulse. That is, assuming that a dispersion in the energy per pulse is denoted by $\Delta P/P$ and a necessary exposure light quantity control accuracy is denoted by A, then the number N of exposure pulses necessary for it is expressed by the following relationship.

$$N \geq \{(\Delta P/P)/A\}$$

For example, when the dispersion $\Delta P/P$ in the energy per pulse is 15%($3\sigma$) and the exposure quantity control accuracy A is 1.5%($3\sigma$), a relationship of $N \geq 100$ is satisfied so that a desired accuracy can be attained with continuous oscillation of 100 or more pulses.

Meanwhile, a stepper repeats its exposure and stage shift operations alternately. Thus, the running state of the excimer laser as a light source becomes inevitably a so-called burst mode. In the burst mode, such a cycle is repeated that a laser beam is pulse-oscillated a predetermined number of times and thereafter the pulse oscillation is paused for a predetermined time. In other words, a continual pulse oscillation period for a short time and an oscillation pause period for a short time are alternately repeated.

In this specification, the terms "continual pulse" and "continual pulse oscillation" are used with such a meaning that pulse discharging is repetitively carried out to obtain repetitive intermittent pulse laser beams. Accordingly, the above terms are used in the meaning different from that usually used in the general words "continual oscillation laser" and "CW oscillation".

Figure 5:
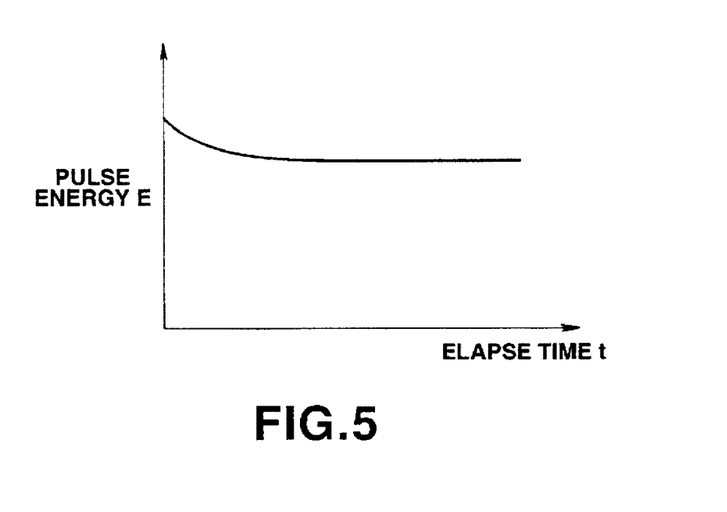
FIG. 5 is a graph showing a relationship between pulse energy and time elapsed from the start of continual pulse oscillation.
Figure 6:
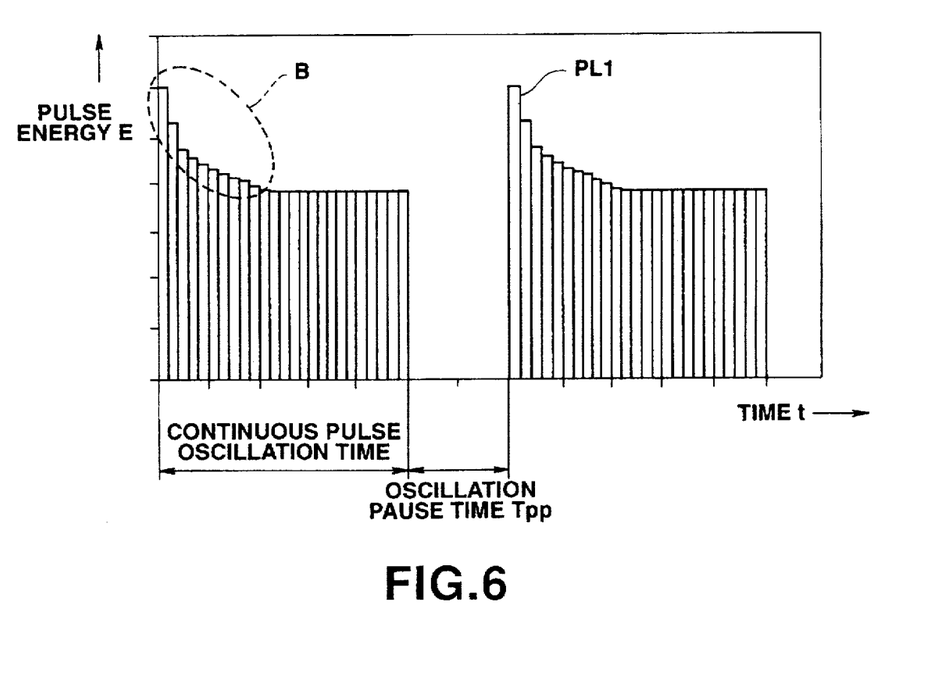
FIG. 6 is a graph showing a manner in which pulse energy E varies with time t, used to show a burst mode and a spiking phenomenon.

As mentioned above, since the excimer laser is of the pulse discharging excitation laser gas type, it is difficult to continue to oscillate always with a predetermined constant level of pulse energy. This is because discharging causes a disturbance of concentration in laser gas within a discharging space, which results in that the next discharging becomes heterogeneous or unstable, causing a temperature rise to take place locally on discharging electrodes with the result of the next discharging further degraded, heterogeneous and unstable. This tendency is remarkable, in particular, at the beginning of the above continual pulse oscillation period, so that, as shown in FIGS. 5 and 6, stable discharging and a relatively high level of pulse energy are obtained with the first pulse PL1 after passage of the oscillation pause period but thereafter, the discharging is gradually degraded and the pulse energy is reduced, that is, a so-called spiking phenomenon (denoted by an area B) occurs.

In this way, the excimer laser device running in the burst mode has a problem that the variations in the energy per pulse limit the exposure quantity control accuracy, the spiking phenomenon remarkably widens the variations and thus limits the exposure quantity control accuracy.

In addition, the sensitivity of photosensitive material coated on wafers has been improved in these years, which allows exposure with use of a less number of continual pulses with a tendency of reducing the number of pulses.

However, such a less number of pulses results in that variations in the exposure light quantity become correspondingly wide and thus it becomes difficult to maintain the exposure quantity control accuracy only by means of the aforementioned plural pulse exposure control. For this reason, it has been demanded that variations in the pulse energy be improved and in particular, the influences of the spiking phenomenon in the burst mode be eliminated.

The inventors of the present application have filed some patent applications relating to control on prevention of generation of such a spiking phenomenon (Japanese Patent Application No. 4-191056, etc.). As a result of our repeated experiments, it has been found that a change in the running condition of a laser device affects the accuracy in the control of prevention of a spiking phenomenon to an unnegligible extent.

In view of such circumstances, it is an object of the present invention to provide a system for a laser device to be run in a burst mode, which can eliminate the influences of a spiking phenomenon to improve an accuracy of exposure light quantity control even with oscillation of a less number of continual pulses and also which can perform the spiking preventing control always accurately even when it is difficult to predict the running condition of the laser.

DISCLOSURE OF THE INVENTION

In accordance with a major aspect of the present invention, there is provided an output control system for a laser device wherein the laser device is operated in a burst mode that repetitive operation is carried out between a pulse oscillating operation of a laser beam continuously by a predetermined number of times and a pause time of the pulse oscillation for a predetermined time and an excitation intensity of the laser is controlled to cause a pulse energy to become a desired value; and which comprises memory means for previously storing therein data of the excitation intensity causing energies of continual pulses to be set at an identical desired value with respect to the respective continual pulses, detection means for detecting an energy of an oscillated pulse, correction means for comparing a detected pulse energy at the time of a continual pulse oscillation already done with the desired pulse energy value and for correcting the previously stored data of the respective excitation intensities corresponding to the pulses on the basis of the comparison result, and control means for controlling the excitation intensities of pulses in the continual pulses to be values corrected by the correction means.

With such an arrangement, the excitation intensity data causing energies for continual pulses to be set to have a desired identical value is previously stored in association with the respective continual pulses. And energies of oscillated pulses are detected. And energies of pulses in continual pulse oscillations already done are detected, the detected values are compared with a desired pulse energy value, and data on each excitation intensity corresponding to previously-stored pulses are corrected on the basis of the comparison result. And the excitation intensity of continual pulses are controlled so as to have a corrected excitation intensity.

Figure 7:
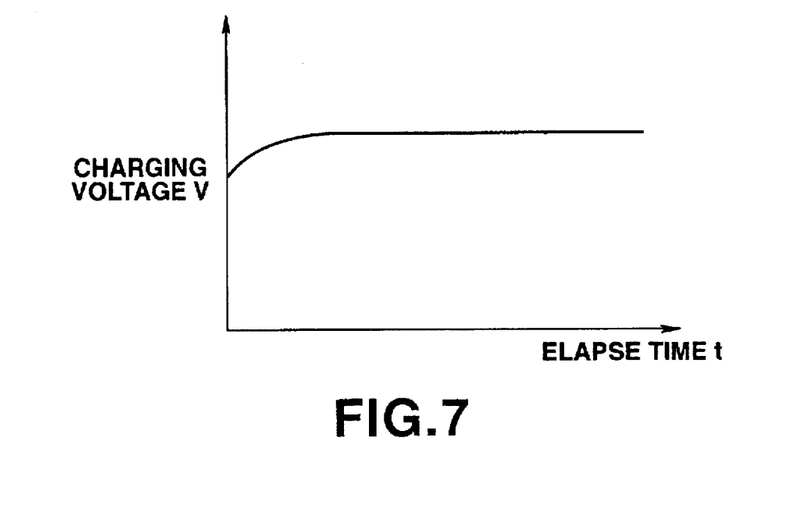
FIG. 7 is a graph showing a relationship between charging voltage and time elapsed from the start of continual pulse oscillation.

That is, for the purpose of eliminating the influence of a spiking phenomenon, the present invention utilizes the fact that a pulse energy in a laser is dependent on the excitation intensity within a predetermined charging voltage range and the higher the excitation intensity is the larger the energy is. Thus, when a continual pulse oscillation is started in a burst mode, the excitation intensity for the first pulse is set to be low and the excitation intensities for the subsequent pulses are changed to be gradually higher to thereby prevent generation of the spiking phenomenon (refer to FIG. 7). Such excitation intensity data are previously stored in association with each of the continual pulses.

Meanwhile, in order to make up for reduction in the laser output caused by the degradation of laser medium gas or the like there sometimes occurs a situation where, as an example, a halogen gas as one component of the laser medium gas is added by a small quantity or the laser medium gas is partially replaced to change the gas composition. This is an example, however, when operating conditions are changed as such, a spiking phenomenon generation pattern is delicately changed, which leads to the fact that, even when control is made to attain the above previously-stored excitation intensity, the spiking phenomenon cannot be completely removed.

To avoid this, in the burst oscillation, the detected pulse energy value in the continual pulse oscillation already done is fed back so to speak to compare the detected value with the desired energy value and to detect the change in the laser operating conditions. On the basis of the comparison result, the respective excitation intensities corresponding to each of the pulses are automatically corrected to perform spiking prevention control according to the change of the laser operating conditions.

In a discharge excitation type laser such an excimer laser device as exemplified in the present specification, the aforementioned 'control of the excitation intensity' is generally carried out by changing the charging voltage. Accordingly, in embodiments to be described later, explanation will be made in connection with a case where the excitation intensity control is carried out by controlling the charging voltage.

BEST MODE FOR CARRYING OUT THE INVENTION

An output control system for an excimer laser device in accordance with an embodiment of the present invention will be explained with reference to the accompanying drawings.

Figure 1:
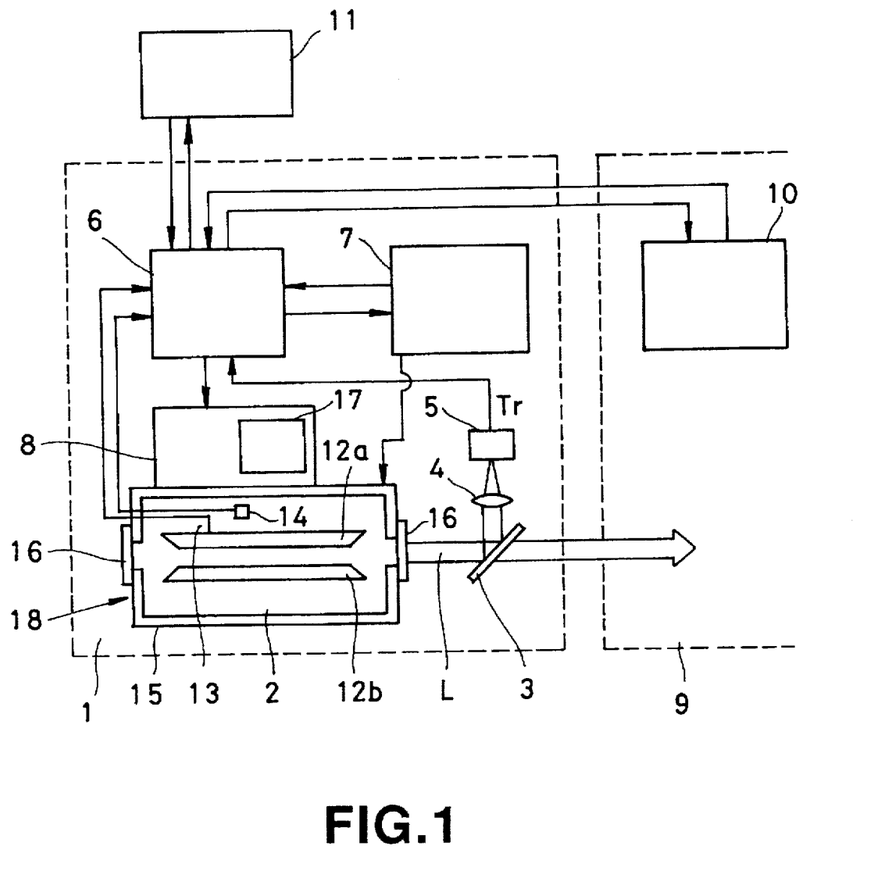
FIG. 1 is a block diagram of an arrangement of an output control system for an excimer laser device in accordance with an embodiment of the present invention.

The embodiment system shown in FIG. 1 mainly includes an excimer laser device 1 for outputting excimer laser beam L and a stepper 9 for carrying out its reduction projection exposing operation with use of the excimer laser beam L and the excimer laser device 1 as a light source.

More in detail, an oscillator 2 in the excimer laser device 1 includes a laser chamber 15, an optical resonator, etc. The laser chamber 15 is filled with a laser gas such as Kr, F2 or the like. Disposed within the laser chamber 15 are electrodes 12a and 12b between which discharging is carried out to excite the laser gas for laser oscillation. The oscillated laser beam is resonated within the optical resonator and outputted from a front mirror (not shown) as the effective oscillated laser beam L. In this case, the discharging is carried out with a predetermined interval and with a predetermined pulse width so that the excimer laser beam L is intermittently outputted.

The thus-oscillated laser beam issued from the oscillator 2 is subjected by a beam splitter 3 to a partial sampling operation and then directed onto an output monitor 5 through a lens 4. The output monitor 5 detects energy of the excimer laser beam L per pulse, i.e., pulse energy E. A light emission signal Tr indicative of detection of one pulse is sent from the output monitor 5 to an output controller 6. The output controller 6, which contains a timer, sequentially measures time intervals between time points at which the controller receives the light emission signals Tr from the output monitor 5 under control of the timer.

Similarly, the pulse energy E detected by the output monitor 5 is applied to the output controller 6, which in turn applies, on the basis of the received pulse energy E, voltage data to a laser power supply 8 in such a manner that a desired pulse energy Ed is obtained, which will be explained later. Through the above operation, powerlok control is carried out.

The powerlok control refers to one of control methods for setting the charging voltage to be high according to the degradation of the laser gas to prevent reduction of the pulse energy E caused by application of even the same charging voltage due to the degradation of the laser gas. In general, this refers to feedback control for accumulating and averaging energies of a plurality of oscillated pulses and comparing with the desired pulse energy Ed to thereby determine charging voltages corresponding to the next and subsequent pulses. The thus-determined charging voltage (charging voltage for obtaining the desired pulse energy Ed) is called a powerlok voltage Vpl. In this connection, the word 'powerlok' is a trademark of U.S. Questek Ltd. The spiking generation preventing control, on the other hand, refers to prediction control for predicting energy per each of pulses to be next continually oscillated and determining a charging voltage for each pulse prior to the oscillation.

The laser power supply 8, according to the received voltage data, applies a potential difference V to between the above electrodes to perform the above discharging operation. The voltage for causing the discharging is once charged through a charging circuit 17 provided in the laser power supply 8 and discharged through the operation of a switching element as, for example, a thyratron. The charging circuit 17 is provided as a replaceable unit.

The output controller 6 is connected via a signal line to a stepper controller 10 provided within the stepper 9 to receive a trigger signal from the stepper controller 10.

A gas controller 7 functions to perform partial gas exchanging operation of the laser gas during operation of the laser device so that laser output is kept constant and also performs gas exchanging operation so that predetermined sorts of laser gases have their predetermined partial pressures prior to the operation of the laser device. To this end, more specifically, the gas controller 7 controls the amount of laser gas to be supplied into the laser chamber 15 through valves, etc. and also controls the amount of laser gas emitted from the laser chamber 15 through a vacuum pump, etc. Transfer of predetermined data is carried out between the gas controller 7 and the output controller 6 so that the data necessary to calculate gas partial pressures or partial pressures at the time of exchanging all or part of the laser gas, adding some laser gas, etc. is sent from the gas controller 7 to the output controller 6.

An electrode temperature sensor 13 for detecting a surface temperature The of the electrode 12a is disposed on the surface of the discharging electrode 12a (cathode) in an upper side of an interior of the laser chamber 15, while a gas temperature sensor 14 for detecting a temperature Thm of the laser gas is disposed within the laser chamber 15. Detection signals indicative of the temperatures The and Thm detected by these sensors 13 and 14 are sent to the output controller 6. In this connection, the electrode temperature sensor 13 may be positioned on a surface of the lower electrode 12b (anode) as necessary. The laser chamber 15 is provided with windows 16 and 16 for externally emitting the laser beam therethrough. More specifically, these windows 16 are replaceably provided to the laser chamber 15 so as to be able to avoid the reduction of the output caused by adhesion of reaction products thereto. A laser head 18 comprising the above laser chamber 15 and laser power supply 8 as its main components is also replaceably provided to allow the avoidance of deterioration of performance caused by the deterioration of composing parts. Among the composing parts of the laser head 18, in particular, the discharging electrodes 12a and 12b are remarkable in the wear deterioration. Accordingly, replacement of the laser head 18 is carried out mainly for the purpose of maintaining the performance of the electrodes 12a and 12b.

A remote controller 11, which is provided outside the excimer laser device 1, is used for remote control of the excimer laser device 1.

The present embodiment is designed to find a charging voltage V corresponding to each of pulses in a continual pulse train taking parameters which follow into account.

(a) Consideration of a pause time Tpp of pulse oscillation:

When the excimer laser is operated in the burst mode, the pulse energy E becomes large immediately after the laser starts the continual pulse oscillation and thereafter is reduced gradually to a desired level, that is, a spiking phenomenon takes place (refer to B in FIG. 6). And the spiking phenomenon has a property that the larger the pause time Tpp is the more remarkable the spiking phenomenon is, so that the number of pulses affected by the spiking phenomenon becomes large as the charging voltage V for causing excitation of the laser gas is increased.

Thus, the pause time Tpp of pulse oscillation is measured, and the magnitude of the charging voltage V corresponding to each pulse is changed on the basis of the measured pause time Tpp so that the pulse energy E has a desired identical level Ed for each of pulses in the continual pulses. That is, the charging voltage V is set to be low for the first one in the continual pulses and to be gradually increased for each pulse to thereby prevent the initial energy rise caused by the spiking phenomenon (refer to FIG. 7). In addition, the degree of a variation in the charging voltage V is set differently according to the pause time Tpp.

Figure 8A:
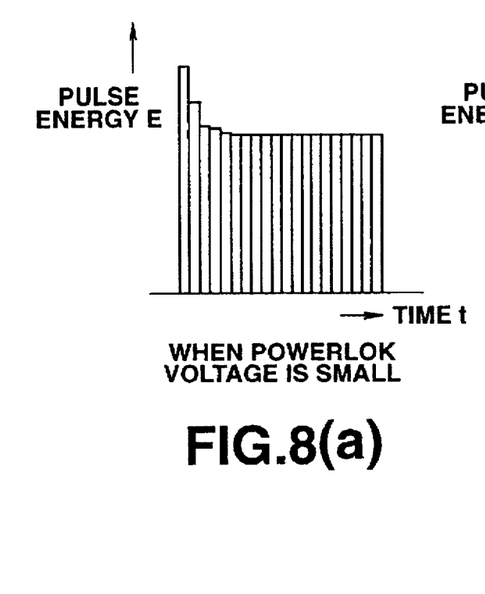
FIGS. 8(a) and 8(b) are graphs showing a manner in which pulse energy varies with time, used to show that the spiking phenomenon is affected differently by the magnitude of a powerlok voltage, respectively.
Figure 8B:
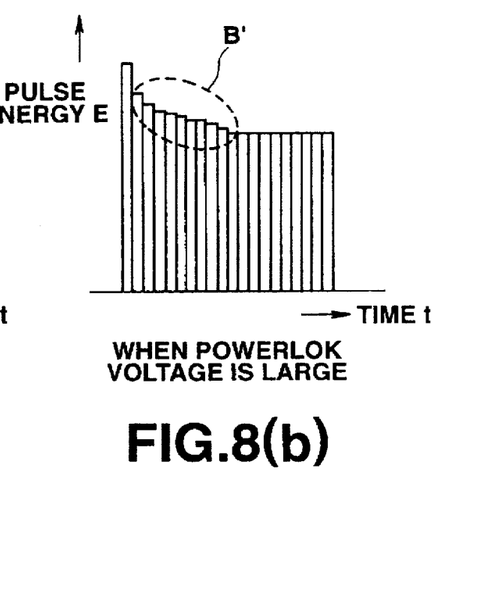

(b) Consideration of the powerlok voltage Vpl:

The longer running time of the laser oscillation causes deterioration of the laser gas, involving gradual reduction of the output. To avoid this, the powerlok control (the charging voltage for causing a desired average pulse energy being called the powerlok voltage) is carried out according to the output reduction. Meanwhile, it has been found from experiments by the inventors of the present application that the performance of the powerlok control undesirably causes a change of the spiking phenomenon generation pattern. That is, it has been found that the pulse energy E of each pulse varies with the magnitude of the powerlok voltage Vpl and also the number of pulses affected by the spiking phenomenon varies therewith. Typical patterns of the spiking phenomenon generation are shown in FIG. 8(a) when the powerlok voltage is small and shown in FIG. 8(b) when the powerlok voltage is large, respectively. It will be seen from these drawings that a change of the pulse energy caused by a change of the powerlok voltage clearly appears in an area B' in FIG. 8(b).

For the purpose of eliminate such a phenomenon, in the present embodiment, the charging voltage V is varied according to the powerlok voltage Vpl so that the pulse energy E has a desired level Ed for each pulse.

It also has been found that the spiking phenomenon generation pattern varies even with parameters which follow. Thus, in order to set equal the energy levels for the respective pulses, it is necessary to also take the following parameters (c) to (o) into account.

(c) Consideration of a time Tg elapsed from the sealing of new laser gas into the laser chamber 15 through gas replacement:

(d) Consideration of a number Ng of oscillation pulses after the sealing of new laser gas into the laser chamber 15 through gas replacement:

(e) Consideration of the sorts of laser gases sealed within the laser chamber 15 through gas replacement as well as the partial pressures of the laser gases of the sorts; consideration of, for example, partial pressures Pt, Ph and Pb of the laser gas composed of a rare gas (Kr), halogen gas (F) and buffer gas (Ne):

(f) Consideration of the temperature Thm of the laser gas:

(g) consideration of the surface temperature The of the discharging electrode 12a:

(h) Consideration of a repetitive frequency f of continual pulse oscillation:

(i) Consideration of a time Tt elapsed from the start of running the excimer laser device 1:

(j) consideration of a pulse oscillation interval Td:

(k) Consideration of an oscillation pulse number Nh accumulated from the replacement of the laser head 18:

(l) Consideration of an oscillation pulse number Nc accumulated from the replacement of the charging circuit 17:

(m) Consideration of an oscillation pulse number Nw accumulated from the replacement of the laser window 16:

(n) Consideration of the pulse energy E corresponding to each charging voltage V in the continual pulse oscillation mode:

(o) Consideration of an HF concentration as an impurity in the laser gas:

Explanation will be made as to the controlling operation of the output controller 6 by referring to flowcharts shown in FIGS. 2 to 4.

* First Control

Figure 2A:
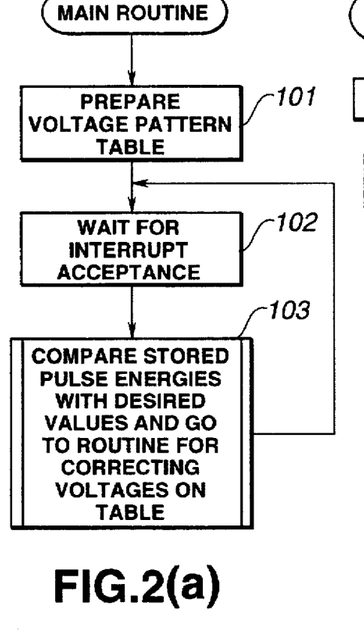
FIGS. 2(a) to 2(c) collectively show a flowchart for explaining a processing procedure of the embodiment.
Figure 2B:
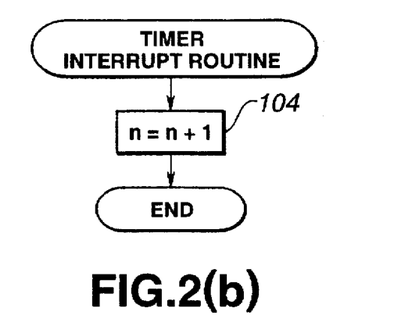
Figure 2C:
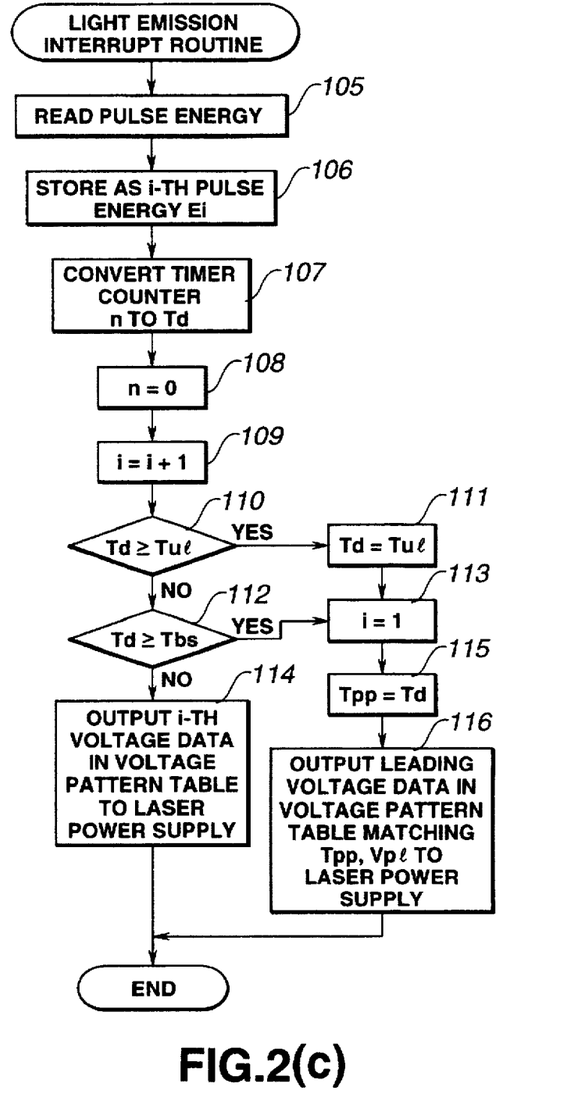

FIGS. 2(a) to 2(c) show flowcharts for explaining the operation executed in the output controller 6, taking the above parameters (a), (b) and (n) into account.

In the present embodiment, the pulse energies E for pulses are set to be a desired equal degree Ed. The immediately-previous pause time Tpp as well as the charging voltage V corresponding to the powerlok voltage Vpl are previously found for each of pulses in the continual pulse oscillation, i.e., in an oscillation sequence i and stored in a predetermined memory as voltage data. And energies of pulses in the previous continual pulse oscillation are detected and compared with the above desired value Ed to correct the voltage data stored in the memory. The thus-corrected voltage data are read out from the memory and output to the laser power supply 8.

That is, in the main routine, as shown in FIG. 2(a), concerrent to the start, the output controller 6 finds a charging voltage V(i) corresponding to a pulse of the oscillation order i-th in the form of a function Vi(Tpp,Vpl) as shown in the following equation (1) where Tpp and Vpl are taken as variables, and stores in the memory in the form of a voltage pattern table. In this case, continual pulses (i=1, 2,3. . . . ) having the same values of the variables Tpp and Vpl are paired and stored in the memory as a set unit.

$$V(i)=V(Tpp,Vpl) \quad (1)$$

where V(i) is the charging voltage of the i-th pulse in the continual pulse oscillation, Vi is a function for determining the charging voltage of the i-th pulse in the continual pulse oscillation, Tpp is an oscillation pause time, and Vpl is a powerlok voltage (refer to a step 101).

The output controller 6 performs predetermined interrupting operation at the time of receiving the light emission signal Tr and at the time of counting the timer. In other words, when the preparation of the above voltage pattern table and the storing operation are completed, the controller enters into an interrupt wait loop (steps 102 and 103). In the process, the controller is first put in its interrupt acceptance state at which the oscillation start is enabled (step 102). And the process is shifted to such a voltage correction routine to be describe later as shown in FIG. 4, where the energies of the previous continual pulses saved in a light emission interrupt routine shown in FIG. 2(c) are compared with the desired value Ed to correct the voltage data on the voltage pattern table and to obtain voltage data to be used in the next continual pulse oscillation (step 103). When the output controller 6 is put in the interrupt acceptance wait state and the main routine enters into the interrupt wait loop, a timer interrupt routine shown in FIG. 2(b) is started to accept an interrupt based on the built-in timer. In the timer interrupt routine, the counter is counted up for a period after reception of the previous light emission signal Tr until reception of the next light emission signal Tr to increment its count number n sequentially by +1 (step 104).

Under this condition, when the next light emission signal Tr is received, the light emission interrupt routine shown in FIG. 2(c) is started.

In the routine, first of all, a pulse energy is read (step 105) and the read pulse energy is stored and saved as a value Ei associated with the oscillation order i. At this time, the oscillation pause time Tpp and the powerlok voltage Vpl immediately prior to the start of the this-time continual pulse oscillation are also stored and saved at the same time. It is recognized on the basis of the count number i that the oscillated pulse corresponds to what numbered pulse in the this-time continual pulse oscillation (step 106).

Next, in order to measure a pulse oscillation interval time, the counting-up operation in the timer interrupt routine is stopped and the count number n at that time is converted to a corresponding time, i.e., to a pulse oscillation interval Td. For example, if the timer interrupt interval is 10 msec. and the count number n is 15, then the pulse oscillation interval Td is 150 msec. corresponding to a multiplication of the both (step 107). Subsequently, the count number n of the timer is reset to zero (step 108).

The output controller 6 also has a counter to be counted up by the light emission signal Tr, and the light emission signal count number i of the timer is incremented by +1 (step 109).

It is then judged whether or not the pulse oscillation interval Td obtained at the step 107 is not less than a predetermined upper limit value Tul. The upper limit value Tul is determined as such, the effect of changing the pulse energy E of the spiking phenomenon is constant and independent on the pulse oscillation interval Td on the basis of experiments and is stored in the predetermined memory (step 110). It is judged whether or not the pulse oscillation interval Td obtained at the step 107 is not less than a predetermined lower limit value Tbs. That is, when the pulse oscillation time interval is sufficiently small, the influence of concentration disturbance or the like by the immediately-previous pulse oscillation strongly remains in the discharging space and thus no spiking phenomenon takes place. The lower limit value Tbs, below which no spiking phenomenon takes place, is experimentally found and stored in the predetermined memory (step 112).

If it is now judged that the pulse oscillation interval Td is not less than the upper limit value Tul (judgement "YES" at the step 110), then the Td is set to be equal to the Tul (step 111) so that the count number i of the light emission signal counter is set at "1" (step 113). And the pulse oscillation interval Td is set to be equal to the oscillation pause time Tpp (step 115), and the powerlok voltage Vpl and the discharge voltage V(i) corresponding to Tpp=Tul and i=1 at this time point are read out from the memory and outputted to the laser power supply 8 to cause discharging operation. As a result, the first pulse in the continual pulse oscillation is set to cause the influence of the spiking phenomenon to be removed, whereby the desired pulse energy Ed is obtained. In addition, when the pulse oscillation interval Td is not less than the upper limit value Tul, it is unnecessary to previously store data on a plurality of discharge voltages V(i) according to the pulse oscillation interval Td and it is only required to store only the data of the charging voltage V(i) uniquely determined based on the constant value Tul, which results in that the memory is only required to have a less capacity and thus costs can be reduced (step 116).

When the pulse oscillation interval Td is not less than the lower limit value Tbs and smaller than the upper limit value Tul (judgement "YES" at the step 112), the continual pulse oscillation is regarded as completed and the count number i of the light emission signal counter is set at "1" to remove the influence of the spiking phenomenon from the first pulse in the next-time continual pulse oscillation (step 113). And the pulse oscillation interval Td is set to be equal to the oscillation pause time Tpp (step 115), the oscillation pause time Tpp, the powerlok voltage Vpl at the current time point and the discharge voltage V(i) corresponding to i=1 are read out from the memory and outputted to the laser power supply 8 to cause discharging operation. As a result, the first pulse in the continual pulse oscillation is set to cause the influence of the spiking phenomenon to be removed, whereby the desired pulse energy Ed is obtained (step 116).

When the pulse oscillation interval Td is smaller than the lower limit value Tbs (judgement "NO" at the step 112), the immediately-previous oscillation pulse causes no spiking phenomenon to take place, at which time the continual pulse oscillation is judged as continued. The oscillation pause time Tpp immediately before starting the this-time continual pulse oscillation, the powerlok voltage Vpl and the charging voltage V(i) corresponding to the incremented i obtained at the step 109 are read out from the memory and outputted to the laser power supply 8 to cause the discharging operation. This results in that the i-th pulse in the continual pulse oscillation causes the influence of the spiking phenomenon to be eliminated, whereby the desired pulse energy Ed is obtained (step 114).

Figure 4:
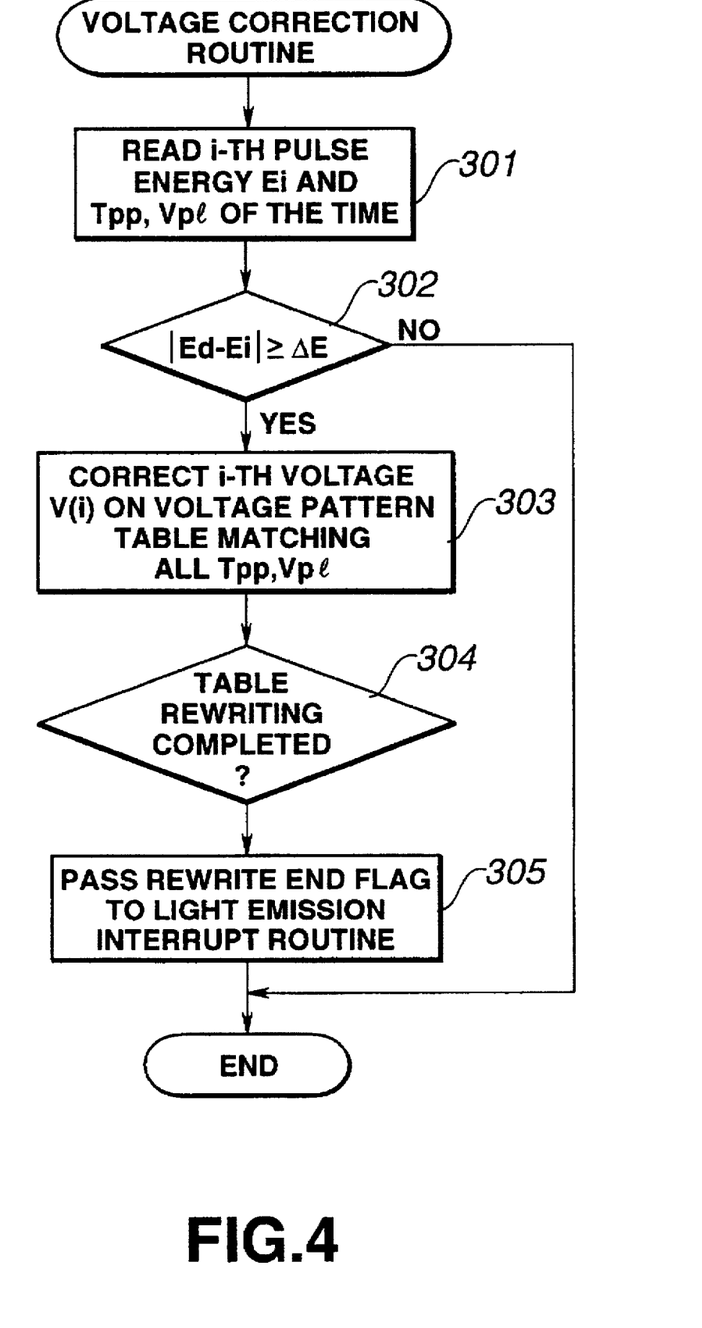
FIG. 4 is a flowchart for explaining a processing procedure in the embodiment.

In this way, in the first control, the charging voltage V(i) is found in accordance with the function taking the oscillation pause time Tpp and powerlok voltage Vpl into consideration, and the found charging voltage is corrected on the basis of comparison between the energy of each pulse saved at the time of the previous-time continual pulse oscillation and the desired value Ed (FIG. 4 will be explained later).

* Second Control

Such an embodiment is possible that, in addition to the above oscillation pause time and powerlok voltage, the aforementioned parameters (c), (d) and (e) are taken into consideration. The reason for it is that the spiking phenomenon generation pattern is considered to be dependent on the laser gas composition, partial pressure according to the composition, elapse time Tg and accumulated oscillation pulse number Ng.

$$V(i)=Vi(Tpp,Vpl,Pr,Ph,Pb,Tg,Ng) \qquad (2)$$

where V(i) is the charging voltage of the i-th pulse in the spiking phenomenon, Vi is a function for determining the charging voltage of the i-th pulse in the continual pulse oscillation, Tpp is oscillation pause time, Vpl is powerlok voltage, Pr is the partial pressure of a rare gas (such as Kr) contained in the laser gas sealed within the laser chamber 15 at the time of gas replacement, Ph is the partial pressure of a halogen gas (such as F2) contained in the laser gas sealed within the laser chamber 15 at the time of the gas replacement, Pb is the partial pressure of a buffer gas (such as Ne) contained in the laser gas sealed within the laser chamber 15 at the time of the gas replacement, Tg is a time elapsed from the sealing of a new laser gas within the laser chamber 15 through the gas replacement, and Ng is an oscillation pulse number accumulated from the sealing of the new laser gas within the laser chamber 15 through the gas replacement.

In a KrF excimer laser, in general, since krypton is used as a rare gas, fluorine is used as a halogen gas, helium, neon or a mixture gas of helium and neon is used as a buffer gas, three sorts of gas partial pressure parameters Pr, Ph and Pb are taken into consideration in the above equation (2).

Even in the second control, as in the first control, the processing is carried out in accordance with the procedures shown in FIGS. 2(a), 2(b), 2(c) and 4.

* Third Control

Such an embodiment is also possible that all the parameters (a) to (o) are taken into account. Even in the third control, as in the first control, the processing is carried out in accordance with the procedures shown in FIGS. 2(a), 2(b), 2(c) and 4. However, the processing of FIG. 2(a) is replaced by the processing of FIG. 3. Explanation will be detailed as to the processing contents of FIG. 4 which is not detailed in the first processing yet.

Figure 3:
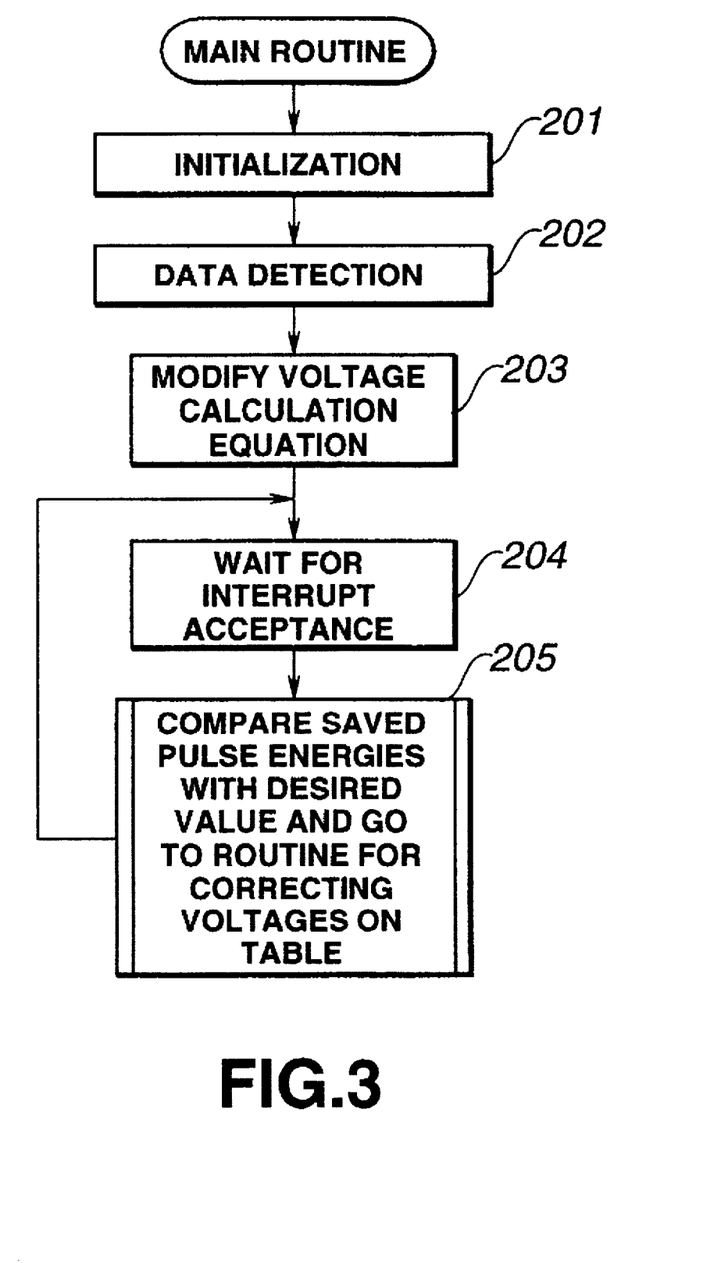
FIG. 3 is a flowchart for explaining a processing procedure in place of that of FIG. 2(a)

As shown in FIG. 3, at the same time when the main routine is first started, initialization for the respective parts is carried out (step 201).

Then data relating to the above parameters (a) to (o) are acquired. Meanwhile, the charging voltage V(i) corresponding to the i-th pulse of the oscillation order is previously found by experiment in the form of the following function Vi (Tpp,Vpl, ... ) having the above parameters Vpp, Vpl, ... as its variables and stored in the memory. Accordingly, when the values of the variables Tpp, Vpl, ... are found, the corresponding charging voltage can be obtained by substituting these values into the function Vi( ).

$$V(i)=Vi(Tpp,Vpl,Tg,Ng,Pr,Ph,Pb,Thm,The,f,Tt, Td,Nh,Nc,Nw,E, Chf) \qquad (3)$$

where V(i) is the charging voltage of the i-th pulse in the continual pulse oscillation, Vi is a function for determining the charging voltage of the i-th pulse in the continual pulse oscillation, Tpp is oscillation pause time, Vpl is powerlok voltage, Tg is consideration of a time elapsed from the sealing of a new laser gas within the laser chamber 15 through gas replacement, Ng is an oscillation pulse number accumulated from the sealing of the new laser gas within the laser chamber 15 through gas replacement, Pr is the partial pressure of a rare gas (such as Kr) contained in the laser gas sealed within the laser chamber 15 at the time of the gas replacement, Ph is the partial pressure of a halogen gas (such as F2) contained in the laser gas sealed within the laser chamber 15 at the time of the gas replacement, Pb is the partial pressure of a buffer gas (such as Ne) contained in the laser gas sealed within the laser chamber 15 at the time of the gas replacement, Thm is the temperature of the laser gas, The is the temperature of the discharging electrode 12a, f is the repetitive frequency of the continual pulse oscillation, Tt is a time elapsed from the start of operation of the laser device, Td is the pulse oscillation interval, Nh is an oscillation pulse number accumulated from the exchange of the charging circuit 17, Nc is an oscillation pulse number accumulated from the exchange of the charging circuit 17, Nw is an oscillation pulse number accumulated from the exchange of the laser window 16, E is pulse energy at the time of the previous-time continual pulse oscillation, and Chf is HF concentration.

Among these parameters, the oscillation pause time Tpp is found through calculation in the step 107. The powerlok voltage Vpl is set when the powerlok control is carried out. The elapse time Tg is obtained by reading out a current measured time value of a predetermined timer measuring a time elapsed from the gas replacement prior to starting the operation of the laser under control of the gas controller 7. The accumulated oscillation pulse number Ng is obtained by reading out a current value of a predetermined counter counting the number of pulses from the gas replacement.

The values of the partial pressures Pr, Ph and Pb are detected by the gas controller 7 at the time of the gas replacement, in which case these values may be calculated, taking into consideration increases or decreases in the respective gases caused by the gas addition during the laser operation or by partial replacement as well as a decrease in the halogen gas caused by the reaction. In the absence of the gas addition or partial replacement, the values of the parameters other than the halogen gas may be used until the next replacement.

Further, the Thm of the laser gas is acquired in the form of an output of the gas temperature sensor 14, while the The of the discharging electrode 12a is acquired in the form of an output of the electrode temperature sensor 13. The repetitive frequency f may be used as a value previously set as a laser operational condition. The elapse time Tt is acquired in the form of the measured-time value of the timer which is started at the time of starting the operation of the laser device. The pulse oscillation interval Td is also acquired on the basis of the reception interval of the light emission signal Tr.

The accumulated oscillation pulse numbers Nh, Nc and Nw are obtained by counting the number of pulses from the replacement of the respective units with use of a predetermined counter. Further, the HF concentration is detected by an HF sensor (not shown) disposed within the laser chamber 15. In this way, the values of the respective parameters are detected at the time of starting the laser (step 202).

When the values of the parameters are detected at the time of the starting the laser in this way, the function Vi( ) for voltage calculation is modified (step 203). The interrupt acceptance wait loop of the subsequent steps 204 and 205 has the same contents as the loop of the steps 102 and 103.

More specifically, when control is shifted to the voltage correction routine (step 205), as shown in FIG. 4, the energy Ei of the i-th pulse in the previous-time continual pulse oscillation, the oscillation pause time Tpp immediately prior to the previous-time continual pulse and the powerlok voltage Vpl set in connection with the previous-time continual pulses stored and saved in the light emission interrupt routine are first read out therefrom (step 301). And the energy Ei is compared with the desired value Ed so that, when the absolute value of a difference therebetween is less than $\Delta E$ (judgement "NO" at the step 302), control is returned directly to the main routine. When the above difference absolute value is not less than the $\Delta E$ (judgement "YES" at the step 302), the i-th voltage V(i) on the voltage pattern table corresponding to all the oscillation pause times Tpp and all the powerlok voltages Vpl is corrected.

The correction is carried out so that, when the difference between the desired value Ed and the pulse energy Ei is not less than the threshold value $\Delta E$, the value of the i-th charging voltage V(i) is increased; whereas, when the difference is smaller than the threshold value, the value of the charging voltage V(i) is decreased. The above threshold may be set to be $\Delta E'$ and $\Delta E''$ differently with respect to the increase and decrease of the charging voltage and the increase/decrease values $\Delta V'$ and $\Delta V''$ may be differentiated. For example, when Ed-Ei$\geq \Delta E'$, the V(i) is increased to V(i)+$\Delta V'$, while, when Ei-Ed$\geq \Delta E''$, the V(i) is decreased to V(i)-$\Delta V''$. As mentioned above, the function Vi( ) is corrected taking into consideration the pulse energy E at the time of the previous continual pulse oscillation (step 303).

Such correction of the charging voltage is carried out with respect to all the data in the table (step 304). When such rewriting is completed for the entire table, a rewrite completion flag is set and control is shifted to the light emission interrupt routine (FIG. 2(c)) (step 305).

The processing contents of the light emission interruption routine are as mentioned in the first control so that the charging voltage V(i) corresponding to the oscillation pause time Tpp immediately prior to the this-time continual pulse oscillation and the powerlok voltage set value Vpl suitable for the this-time continual pulse oscillation, that is, the charging voltage V(i) corrected in such a manner as mentioned above is read out (step 116).

In the third control, the value of the charging voltage V(i) is corrected with use of the i-th pulse energy Ei when the oscillation pause time Tpp and the powerlok voltage Vpl have predetermined values, but the charging voltage V(i) when the oscillation pause time Tpp and powerlok voltage Vpl have values other than the above predetermined values can be set at a suitable value on the analogy of the above predetermined values. However, such an embodiment is also possible that the charging voltage V(i) when the oscillation pause time Tpp and powerlok voltage Vpl have values other than the above predetermined values is not corrected.

Further, only the HF sensor is provided within the laser chamber 15 as a sensor for detecting impurities in the third control. However, there may be a case where such impurities other than HF as, for example, $N_2$, CO, $OF_2$, $CF_4$, $SiF_4$, $COF_2$, $CO_2$, $NO_2F$, $SF_6$, NOF, $CrO_2F_2$, $CCl_3F$ or $H_2O$ are generated. In this case, when sensors for detecting such impurities are added and the function Vi() for voltage calculation is modified, the accuracy of control of preventing generation of a spiking phenomenon can be further increased.

Although the HF sensor representative of an impurity sensor is provided within the laser chamber 15 in the third control, the impurity sensor may be provided in a port through which the laser gas passes and which is projected from the laser chamber 15, or in a circulation path for circulation of the laser gas with the laser chamber 15.

In the third control, further, since a KrF excimer laser is supposed, explanation has been made in connection with the case where an impurity HF inherent in the KrF excimer laser is detected. However, since the present invention may be applied as a matter of course also to various types of excimer laser including XeCl, ArF, XeF, $F_2$ and KrCl, such an embodiment is possible that a sensor for detecting an impurity inherent in the application is provided, as a matter of course.

In the third control, furthermore, the charging voltage taking the parameters (a) to (o) into account is found as shown by the above equation (3). However, when it becomes clear that a parameter other than the above parameters contributes to generation of a spiking phenomenon, such an embodiment is also possible that its parameter is added to the equation (3) to generate a new function.

Figure 9A:
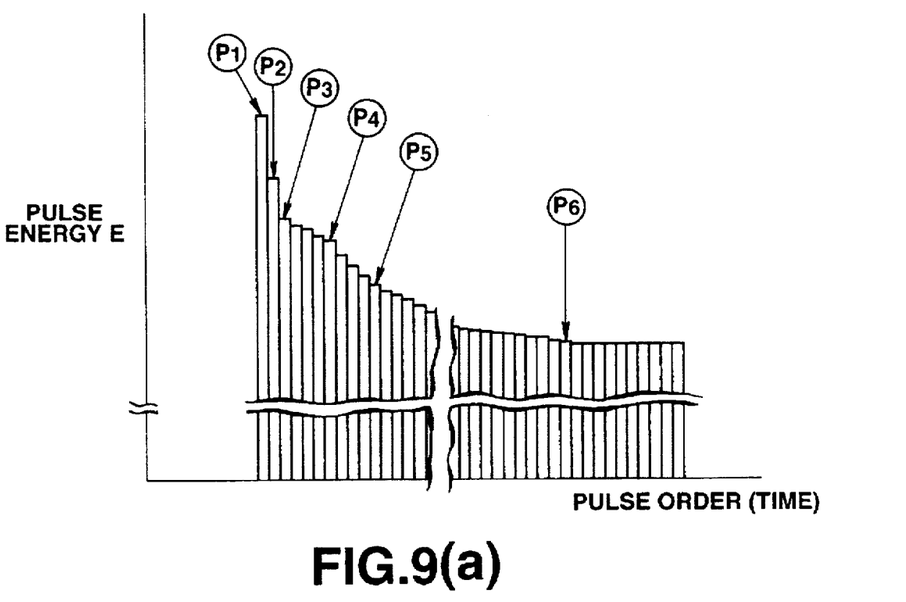
FIGS. 9(a) and 9(b) are graphs for explaining the presence of inflection points in a spiking phenomenon generation pattern respectively.
Figure 9B:
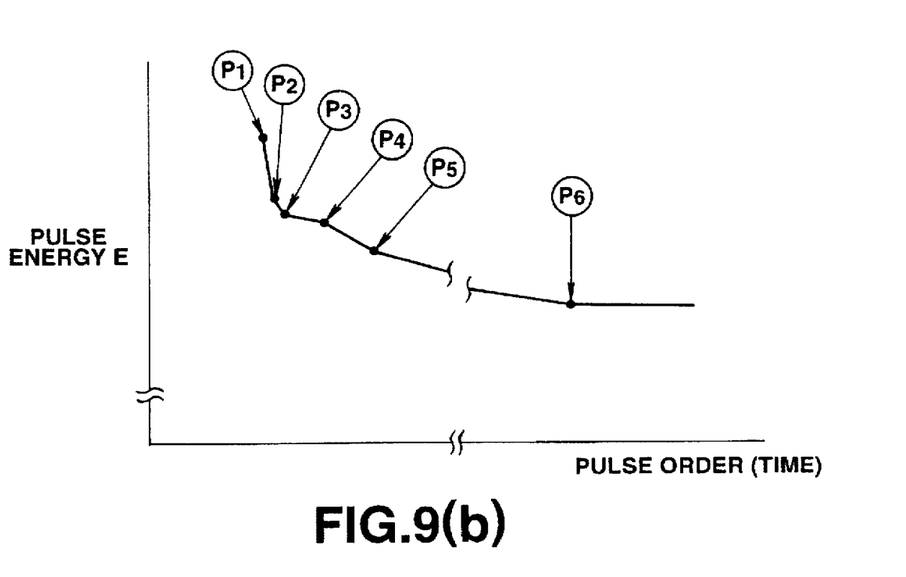

As a result of close observation of the spiking phenomenon generation pattern, it has become clear that there are several inflection points in the pattern as shown in FIG. 9(a). An envelope in FIG. 9(a) is shown in FIG. 9(b). The envelope has such a feature that the energies of pulses between the adjacent inflection points are linearly decreased. The pulses between the adjacent inflection points are regarded as one group and explanation will be made in connection with an embodiment wherein processing is carried out on a group basis.

* Fourth Control

As shown in FIG. 9, with respect to the first and second pulses P1 and P2 in continual pulses, the optimum charging voltage V(i) for each pulse is determined and stored as in the aforementioned first to third controls.

Figure 10A:
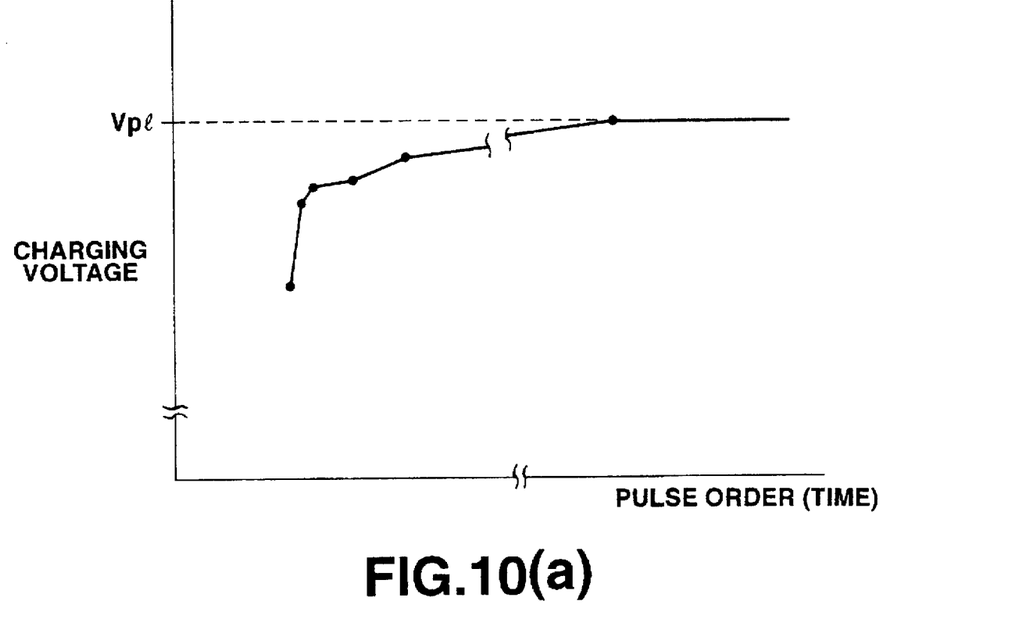
FIGS. 10(a) and 10(b) are graphs for explaining how to calculate a charging voltage of each pulse, which is suitable when inflection points are present in a spiking phenomenon generation pattern.

With respect to pulses P3, P4, P5, ..., Pj corresponding to inflection points, the optimum charging voltage V(i) is determined and stored for each of the pulses P3, P4, P5, ..., Pj. With respect to pulses subsequent to the last inflection point Pj, since discharging is carried out with the powerlok voltage Vpl, the charging voltage V(i) is not determined. The charging voltages thus determined are depicted in FIG. 10(a).

Figure 10B:
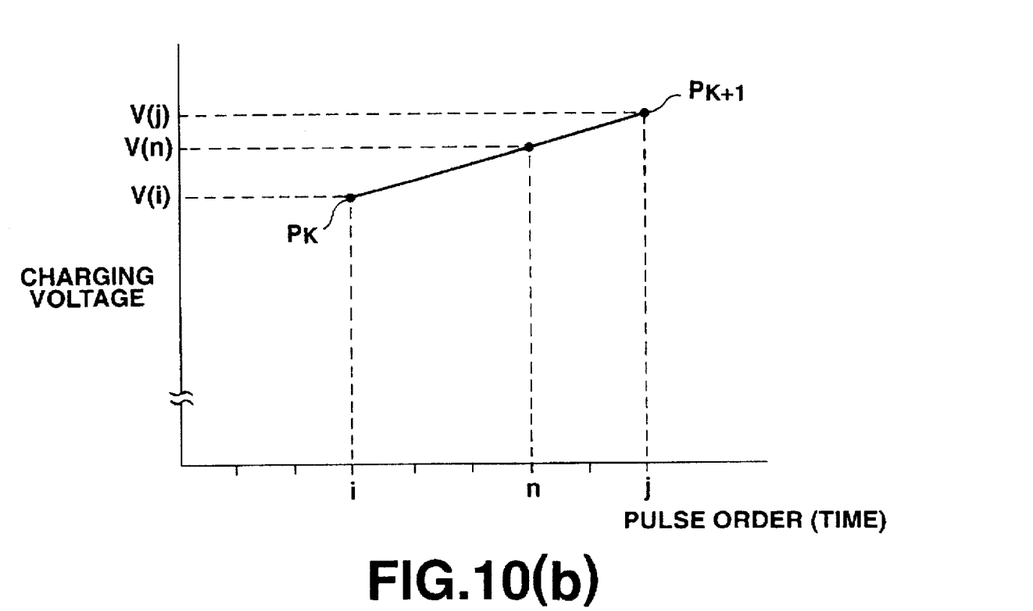

As shown in FIG. 10(b), a charging voltage V(n) for the n-th pulse between adjacent inflection points Pk and Pk+1 is found as a voltage approximated as a straight line having charging voltages V(i) and V(n) of the i-th and j-th pulses corresponding to adjacent inflection points.

Figure 11A:
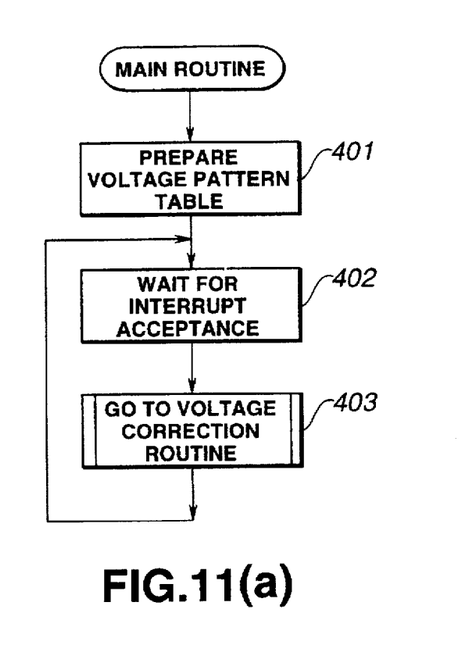
FIGS. 11(a) and 11(b) are flowcharts for explaining the processing procedure of the embodiment suitable when inflection points are present in a spiking phenomenon generation pattern.
Figure 11B:
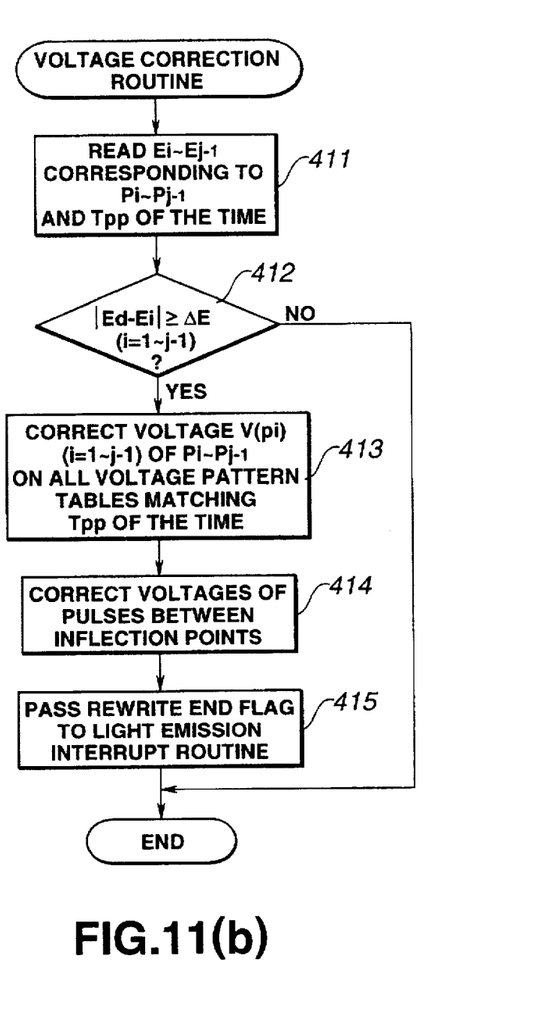

FIGS. 11(a) and 11(b) show the processing procedure of the fourth control. As shown in FIG. 11(a), the processing is carried out in the same manner as FIG. 2(a).

That is, after the main routine is initiated, a voltage pattern table is prepared while such linear approximation calculation as mentioned above is carried out (step 401). And control enters into an interrupt acceptance wait loop (step 402) and goes to such a voltage correction routine as shown in FIG. 11(b) (step 403).

In the voltage correction routine, pulse energies Ei (i=1 to j–1) corresponding to the inflection points P1 to Pj–1 (including P1 and P2) in the previous continual pulses saved and stored in the light emission interruption routine (FIG. 2(c)), the oscillation pause time Tpp immediately preceding the continual pulses and the powerlok voltage set value Vpl for the continual pulses are read out. In this case, the inflection points P1 to Pj–1 are used for a pulse energy comparison. This is because the charging voltages for pulses subsequent to the inflection point Pj correspond to the powerlok voltage Vpl and thus it is unnecessary to prepare the voltage pattern table.

Then the desired energy value Ed is compared with the pulse energies of the respective inflection points Pi so that, when the absolute value of a difference therebetween is less than the threshold value ΔE (judgement "NO" at the step 412), control is shifted directly to the main routine. When the difference is not less than the threshold value ΔE (judgement "YES" at the step 412), a charging voltage V(Pi) corresponding to the inflection point Pi on the voltage pattern table corresponding to the oscillation pause time Tpp immediately preceding this-time continual pulses is corrected (step 413). And charging voltages for pulses between the adjacent inflection points are corrected by the linear approximation with the charging voltages of both of the corrected inflection points Pk and Pk+1, in the same manner as in FIG. 10(b)(step 414). When the correction of the charging voltages on the table is completed in this way, a rewrite flag is set and control is shifted to the light emission interruption routine (FIG. 2(c)).

Although comparison has been made between energies of pulses corresponding to the inflection points in the fourth control, such an embodiment is also possible that an average of energies of pulses contained between the adjacent inflection points is found, the average value is compared with the desired energy value Ed, and on the basis of the comparison result, the discharge voltages corresponding to the pulses contained between the adjacent inflection points are corrected on an across-the-board basis.

Though the charging voltages are corrected on the basis of data at the time of the previous-time (immediately-previous) continual pulse oscillation in the foregoing first to fourth controls, the present invention is not limited to the specific examples but data at the time of a further-previous continual pulse oscillation may be used. Further, such correction may be carried out not with use of data at the time of one continual pulse oscillation but with use of data at the time of two or more continual pulse oscillations.

In the embodiments mentioned above, the pulse oscillation interval is found from the interval of the light emission signal Tr. Instead of this, however, the pulse oscillation interval may be found by measuring the interval of oscillation triggers sent from the stepper controller 10 to the output controller 6.

The foregoing embodiments have been explained on the assumption of the case where the correction is sequentially made during exposure, but such an embodiment is also possible that the correction is completed prior to the exposure. That is, the laser is put in such a state that exposure is not carried out when the laser is started, under which condition the laser is operated in one or plural types of burst modes to perform the correcting operation of the embodiments. And after starting the exposure, control is carried out with use of data of the charging voltages corrected prior to the exposure.

Further, in order to use the corrected data for the next operation, the corrected data may be saved in a nonvolatile memory at the end of the operation of the laser.

Furthermore, although the excitation intensity or discharge voltage of the laser is varied by controlling the charging voltage in the foregoing embodiments, the present invention is not restricted to the control of the charging voltage in the case of such a laser that can change the excitation intensity or discharge voltage in another manner. For example, in the case of a YAG laser, the light intensity of a flash lamp may be controlled. In short, any method may be employed so long as the excitation intensity or discharge voltage can be controlled.

In addition, the output controller 6 is provided within the excimer laser device 1 in the foregoing embodiments, but the output controller 6 may be disposed outside the excimer laser device 1.

INDUSTRIAL APPLICABILITY

As has been explained in the foregoing, in accordance with the present invention, since the influence of a spiking phenomenon is eliminated and energies of pulses are made to be equal in an excimer laser device operated in a burst mode, the accuracy of control of the quantity of exposure light can be remarkably improved even if oscillation is based on a less number of continual pulses. Further, even if it is difficult to predict a change in the operating conditions of the laser, since the change of the operating conditions of the laser can be detected by comparing an actual pulse energy with the desired energy value and the data of the discharge voltage is controllably corrected at an optimum value on the basis of the comparison result, control of preventing generation of a spiking phenomenon can be realized always accurately.

We claim:

1. An output control system for a laser device including a laser power source section for allowing pulse discharging with a predetermined pulse width at a predetermined interval across electrodes disposed within a laser chamber in accordance with applied control data; an oscillator for oscillating a laser beam by exciting a laser gas in the laser chamber by the pulse discharging across the electrodes and for outputting the oscillated laser beam to outside; and an output control section for applying the control data to the power source section so that, in the oscillator, a repetitive operation is carried out between a continuous pulse oscillating operation of the laser beam for a predetermined number of times at a predetermined interval and a pause time of the continuous pulse oscillating operation for a predetermined time, the output control system comprising:

time means for measuring the pause time of the continuous pulse oscillation from end of the continual pulse oscillation to start of a next continual pulse oscillation;

memory means for previously storing therein, for each pulse of the continuous pulse oscillation, control data for setting an energy of one pulse of the laser beam output from the oscillator to a target energy value in accordance with a magnitude of the pause time;

detection means for detecting the energy of one pulse of the laser beam output from the oscillator; and correction means, based on a value obtained by subtracting the target energy value from a detected energy value of each pulse of the laser beam in a previous continuous pulse oscillation and a measured time value of a pause time immediately before the previous continuous pulse oscillation, for correcting the control data previously stored in association with each pulse in accordance with the length of the pause time.

2. An output control system for a laser device as set forth in claim 1, wherein the timer means comprises:

means for measuring intervals of the oscillation pulses; and means for judging whether or not the measured oscillation pulse interval is not more than a predetermined threshold value to thereby judge whether the operation is in the continual pulse oscillation or in the pause time of the continuous pulse oscillation.

3. An output control system for a laser device as set forth in claim 1, wherein, when the pause time measured by the timer means is not less than the predetermined threshold value, the correcting operation of the correction means is not carried out.

4. An output control system for a laser device as set forth in claim 1, wherein the correction means performs data correction operation over the control data when an absolute value of the value obtained by subtracting the target energy value from the detected energy value of each pulse of the laser beam in the previous continual pulse oscillation is not less than a predetermined threshold value, and performs no data correcting operation over the control data when the absolute value of the subtracted value is less than the predetermined threshold value.

5. An output control system for a laser device as set forth in any one of claims 1 to 4, wherein, when the pause time measured by the timer means is not less than the predetermined threshold value, the control data corresponding to the pause time of the magnitude of the predetermined threshold value is applied to the laser power source section.

6. An output control system for a laser device as set forth in any one of claims 1 to 4, wherein the control data are stored in the memory means according to predetermined combinations of parameters including a time elapsed from sealing of the laser gas, a pulse number accumulated from the sealing of the laser gas, a partial pressure of the laser gas, a temperature of the laser gas, a temperate of a discharging electrode, a repetitive frequency of the laser, a time elapsed from start of the operation of the laser device, a pulse oscillation interval, a pulse number accumulated from replacement of a laser head, a pulse number accumulated from replacement of a charging circuit, a pulse number accumulated from replacement of a laser window and an impurity.

7. An output control system for a laser device including a laser power source section for allowing pulse discharging with a predetermined pulse width at predetermined intervals across electrodes disposed within a laser chamber in accordance with applied control data; an oscillator for oscillating a laser beam by exciting laser gas in the laser chamber by the pulse discharging across the electrodes and for outputting the oscillated laser beam to outside; and a controller for applying the control data to the power source so that, in the oscillator, a repetitive operation is carried out between a continuous pulse oscillating operation of the laser beam for a predetermined number of times at a predetermined interval and a pause time of the continuous pulse oscillating operation for a predetermined time, the output control system comprising:

memory means for previously storing therein, for each pulse of the continuous pulse oscillation, control data for setting an energy of one pulse of the laser beam output from the oscillator to a target energy value according to predetermined combinations of parameters including a time elapsed from sealing of the laser gas, a pulse number accumulated from the sealing of the laser gas, partial pressures of the laser gas, a temperature of the laser gas, a temperature of a discharging electrode, a repetitive frequency of the laser, a time elapsed from start of the operation of the laser device, a pulse oscillation interval, a pulse number accumulated from replacement of a laser head, a pulse number accumulated from replacement of a charging circuit, a pulse number accumulated from replacement of a laser window and an impurity concentration;

detection means for detecting the energy of one pulse of the laser beam output from the oscillator; and correction means, based on a value obtained by subtracting the target energy value from a detected energy value of each pulse of the laser beam in a previous continuous pulse oscillation, for correcting the control data previously stored in association with each pulse so that the energy of each pulse of the laser beam output from the oscillator is set to be the target energy value.

8. An output control system for a laser device including a laser power source section for allowing pulse discharging with a predetermined pulse width at predetermined intervals across electrodes disposed within a laser chamber in accordance with applied control data; an oscillator for oscillating a laser beam by exciting laser gas in the laser chamber by the pulse discharging across the electrodes and for outputting the oscillated laser beam to outside; and an output control section for applying the control data to the power source section so that, in the oscillator, a repetitive operation is carried out between a continuous pulse oscillating operation of the laser beam for a predetermined number of times at a predetermined interval and a pause time of the continuous pulse oscillating operation for a predetermined time, the output control system comprising:

memory means for previously storing therein, for each pulse of the continuous pulse oscillation, control data for setting the energy of one pulse of the laser beam output from the oscillator to a target energy value according to predetermined combinations of parameters including a time elapsed from sealing of the laser gas, a pulse number accumulated from the sealing of the laser gas, partial pressures of the laser gas, a temperature of the laser gas, a temperate of a discharging electrode, a repetitive frequency of the laser, a time elapsed from start of the operation of the laser device, a pulse oscillation interval, a pulse number accumulated from replacement of a laser head, a pulse number accumulated from replacement of a charging circuit, a pulse number accumulated from replacement of a laser window and an impurity concentration;

detection means for detecting the energy of one pulse of the laser beam output from the oscillator; and correction means, when an absolute value of a value obtained by subtracting the target energy value from a detected energy value of each pulse of the laser beam in a previous continuous pulse oscillation is not less than a predetermined threshold value, for performing a correction of the control data previously stored in association with each pulse so that the energy of each pulse of the laser beam output from the oscillator is set to be the target energy value and, when the absolute value of the subtracted value is less than the predetermined threshold value, for not performing the correction of the control data.

* * * * *